United States Patent
Gerba et al.

(10) Patent No.: US 8,473,580 B1
(45) Date of Patent: *Jun. 25, 2013

(54) CONTENT MANAGEMENT SYSTEM FOR INTEGRATED DISPLAY SUBSTRATES

(75) Inventors: William F. Gerba, Delray Beach, FL (US); Jeremy Zaretzky, Chicago, IL (US)

(73) Assignee: WireSpring Technologies, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,210

(22) Filed: Aug. 7, 2012

Related U.S. Application Data

(63) Continuation of application No. 13/457,593, filed on Apr. 27, 2012, now Pat. No. 8,260,880.

(51) Int. Cl.
*G06F 15/16* (2006.01)
*G06F 12/00* (2006.01)

(52) U.S. Cl.
USPC .......................................... 709/217; 709/223

(58) Field of Classification Search
USPC ........................... 709/217–219, 223–229, 250
See application file for complete search history.

(56) References Cited

U.S. PATENT DOCUMENTS

| | | | | |
|---|---|---|---|---|
| 6,438,591 | B1 * | 8/2002 | Fehskens et al. | 709/223 |
| 7,631,063 | B1 * | 12/2009 | Ho et al. | 709/223 |
| 8,260,880 | B1 * | 9/2012 | Gerba et al. | 709/217 |
| 2007/0022112 | A1 * | 1/2007 | Asukai et al. | 707/5 |
| 2012/0041999 | A1 * | 2/2012 | Kawamura et al. | 709/201 |

* cited by examiner

*Primary Examiner* — Zarni Maung
(74) *Attorney, Agent, or Firm* — Shawn T. Gordon

(57) ABSTRACT

A system is provided that includes a content management system, a controller, and an electronic display. The electronic display is integrated into an object, such as the packaging of a consumer product. The content management system sends instructions to the controller for determining content to display. The instructions depend in part on status information obtained by the controller from an external source. At least one instruction pertains to extended periods when the controller is unable to communicate with the content management system.

20 Claims, 3 Drawing Sheets

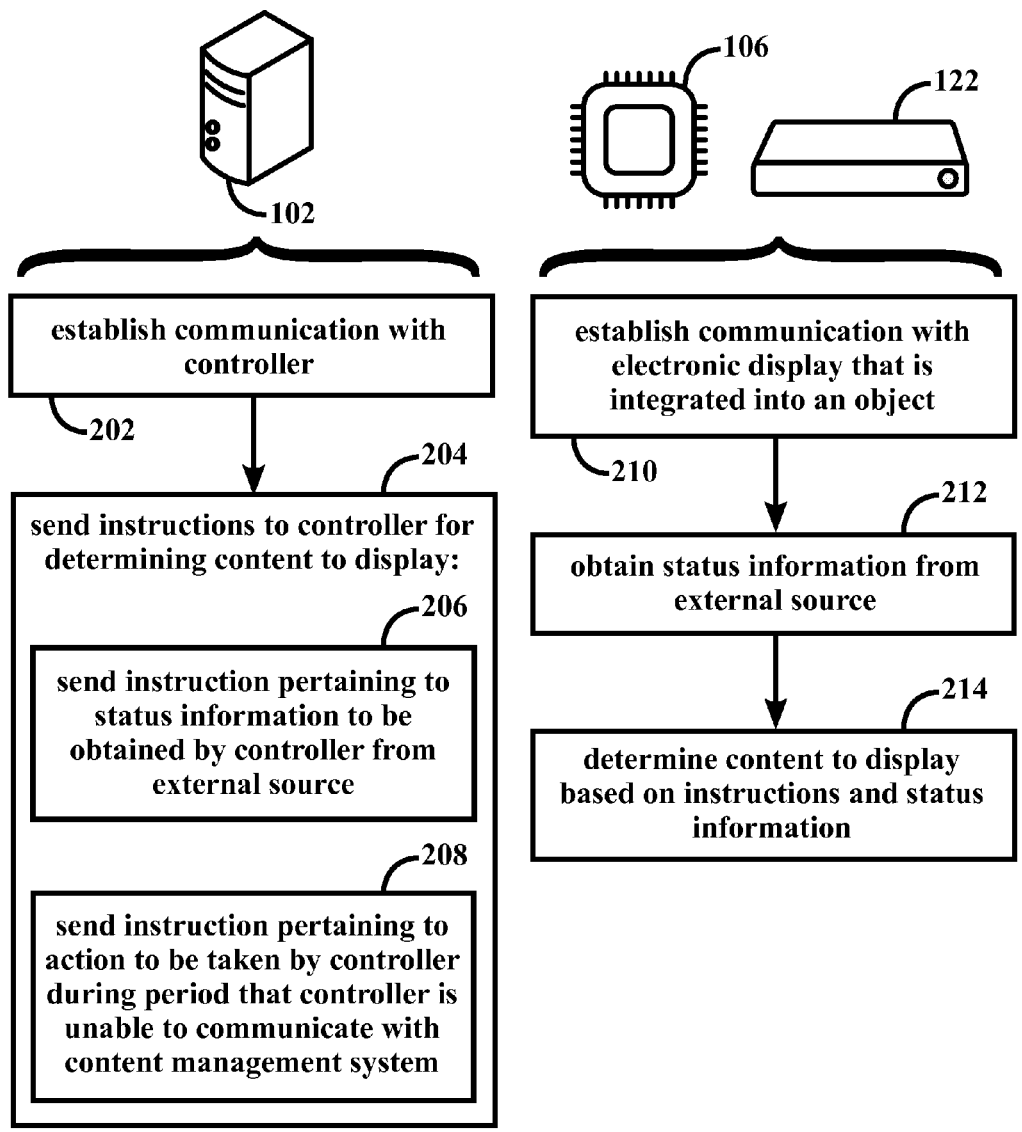

CONTENT MANAGEMENT SYSTEM FOR INTEGRATED DISPLAY SUBSTRATES

CROSS-REFERENCE TO RELATED APPLICATIONS

This application is a continuation and claims the benefit of U.S. patent application Ser. No. 13/457,593 titled "Content Management System for Integrated Display Substrates" and filed Apr. 27, 2012.

STATEMENT REGARDING FEDERALLY SPONSORED RESEARCH OR DEVELOPMENT

Not applicable.

FIELD OF THE INVENTION

This invention relates to the distribution, management, and playback of multimedia content.

BACKGROUND OF THE INVENTION

New display technologies such as electronic paper are making it possible to integrate an electronic display into a wide variety of objects that have not traditionally contained a display, allowing the appearance of the object and the corresponding messaging to be changed dynamically. Changes in appearance and messaging of the displays can be managed through a computerized mechanism. Although such a pairing is not common today, it is possible to use a content management system (CMS) originally designed to control dynamic signs to allow for some level of automated content scheduling on the aforementioned integrated displays, based on unique identification numbers associated with each display, coupled with programmatic rules and playlists. However, such scheduling is a relatively manual process involving many tasks that must be performed by a human operator, and current CMS's are not designed for managing large-scale deployments of integrated displays, especially if unique playlists are to be applied to tens of thousands of displays or more. Further, these prior art CMS's are generally not concerned with automatically managing content throughout the lifecycle of an object.

Accordingly, there is a need for a system that allows objects to display information that is tailored for their current circumstances, allows the information to be updated without undue oversight by human operators, and automates the changing of information based on the current circumstances even when avenues of communication to a centralized control and distribution system are unavailable.

SUMMARY OF THE INVENTION

It is an object of the invention to provide a system for automatically managing content for displays. In an embodiment of the invention, a content management system is in communication with a controller that is in communication with an electronic display that is integrated into an object having a primary function that does not traditionally rely upon an integrated electronic display, wherein the content management system automatically sends instructions to the controller for determining content to display, the instructions depend in part on status information automatically obtained by the controller from a source external to the object, display and controller, and at least one instruction pertains to an action to be taken based on the status information during at least part of a period that the controller is unable to communicate with the content management system, such period having a duration of at least twenty-four hours.

It is a further object of the invention that the displays are printed, laminated, embedded or otherwise affixed to the object.

It is a further object of the invention that the displays are flexible and bend with the underlying surface of the object.

It is a further object of the invention that the displays are capable of holographic or 3D functionality.

It is a further object of the invention that the controller can be connected directly to the displays.

It is a further object of the invention that the controller can be remote from the displays and broadcasts content to the displays via streaming.

It is a further object of the invention that the controller and the content management system can communicate via a computer network, such as the Internet.

It is a further object of the invention that the controller and the content management system can communicate on a client-side pull basis.

It is a further object of the invention that the controller and the content management system can communicate on a server-side push basis.

It is a further object of the invention that the status information is automatically sent from the controller to the content management system, and the content and instructions sent to the controller from the content management system are determined based on the status information.

It is a further object of the invention that power is supplied to the displays wirelessly via solar panels, IR, RF, or other suitable mechanism.

It is a further object of the invention that information about the status of the displays is obtained by sensors located on or near the displays that detect changes in conditions.

It is a further object of the invention that the displays show information that is the same for each display.

It is a further object of the invention that the displays show information that can be different for each display.

It is a further object of the invention that the displays show information that is related to the location of each display.

It is a further object of the invention that the displays enable users to submit feedback on the displayed content and the feedback is used to adjust subsequent displayed content.

It is a further object of the invention that the controller automatically detects additional displays that are located in a nearby position to the display the controller is in communication with and sends instructions to the nearby displays to make the nearby displays and the display function together as a larger display.

It is a further object of the invention that the content can be interactive.

It is a further object of the invention that instructions being sent by the controller include commands to turn the display on or off.

It is a further object of the invention that the status of the displays can be monitored by taking into account factors such as historical logs, historical screenshots, display type, refresh rate, local sensor input, and next check-in time.

It is a further object of the invention that a three-dimensional preview of an object containing multiple displays may be generated by the content management system.

It is a further object of the invention that displays are included on packaging of consumer products to enable the text and graphics on the packaging to be dynamically updated.

It is a further object of the invention that the displays be included on ID badges, hotel keys, payment cards (such as credit and debit cards), driver's licenses, restaurant menus, event tickets, reusable bags, wall surfaces, roadways, or sidewalks.

BRIEF DESCRIPTION OF THE DRAWINGS

FIG. 2 is a flowchart illustrating a method for automatically managing content for displays according to one embodiment of the invention.

DETAILED DESCRIPTION OF PREFERRED EMBODIMENTS

This invention describes a system capable of managing a large number of electronic displays. In particular, the system is capable of managing the dynamic display of not only pre-stored or pre-rendered content, but also fresh content based on data from integrated or remote sensors or information supplied from local or remote data stores (e.g. a local pricing database or a web service that provides information). Likewise, the system is thus capable of managing display content when it would be difficult or impossible for the owners or operators of the displays to determine the status (e.g., location) of each display, for example because displays are integrated into product packages that might be shipped, temporarily stored in distribution warehouses, or are in the possession of a purchaser. In this manner, the system can integrate internal and external management information pertinent to the displays and their function in order to instruct each display about the content that it must show based in part on information automatically obtained by the display controllers.

Figure 1A:
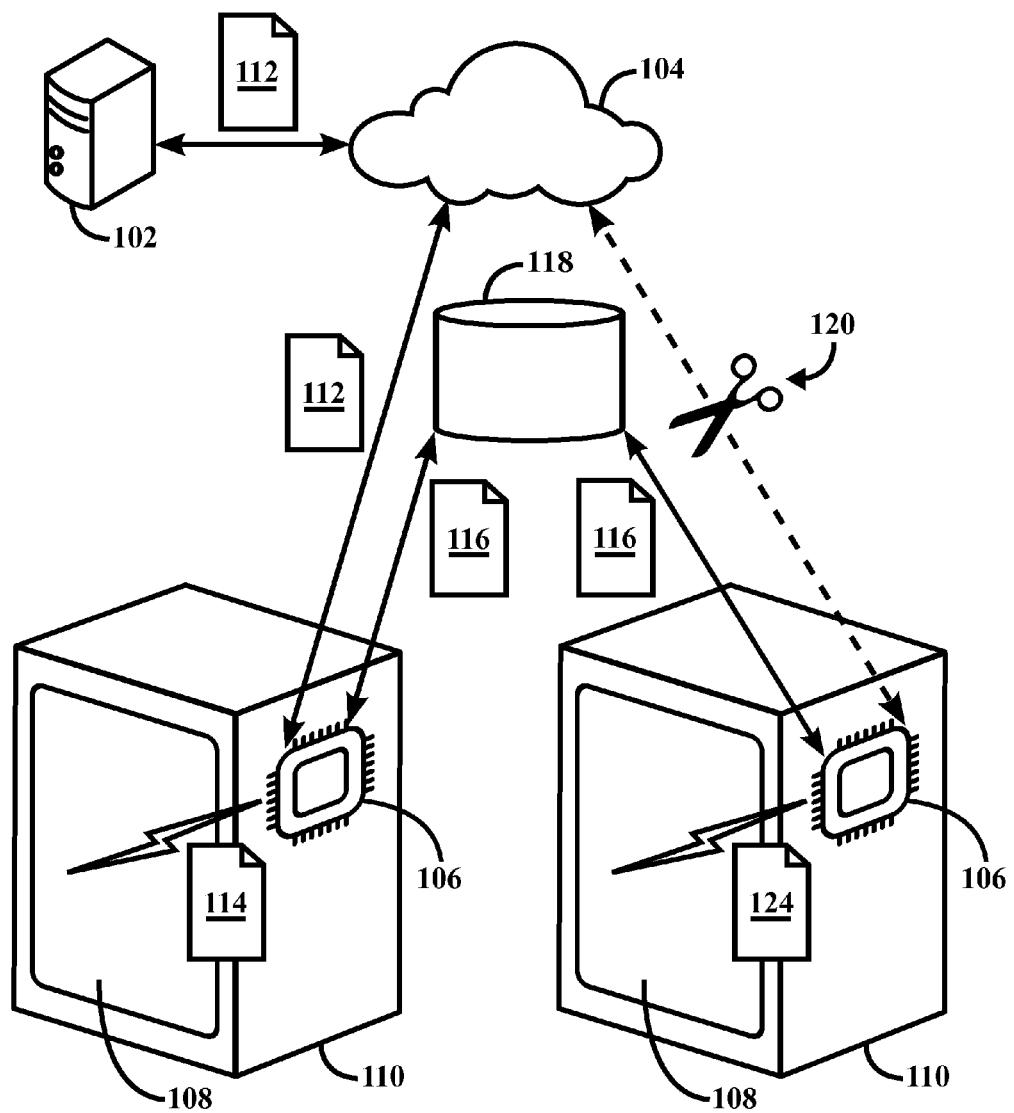
FIG. 1A is a diagram illustrating a system for automatically managing content for displays according to one embodiment of the invention.
Figure 1B:
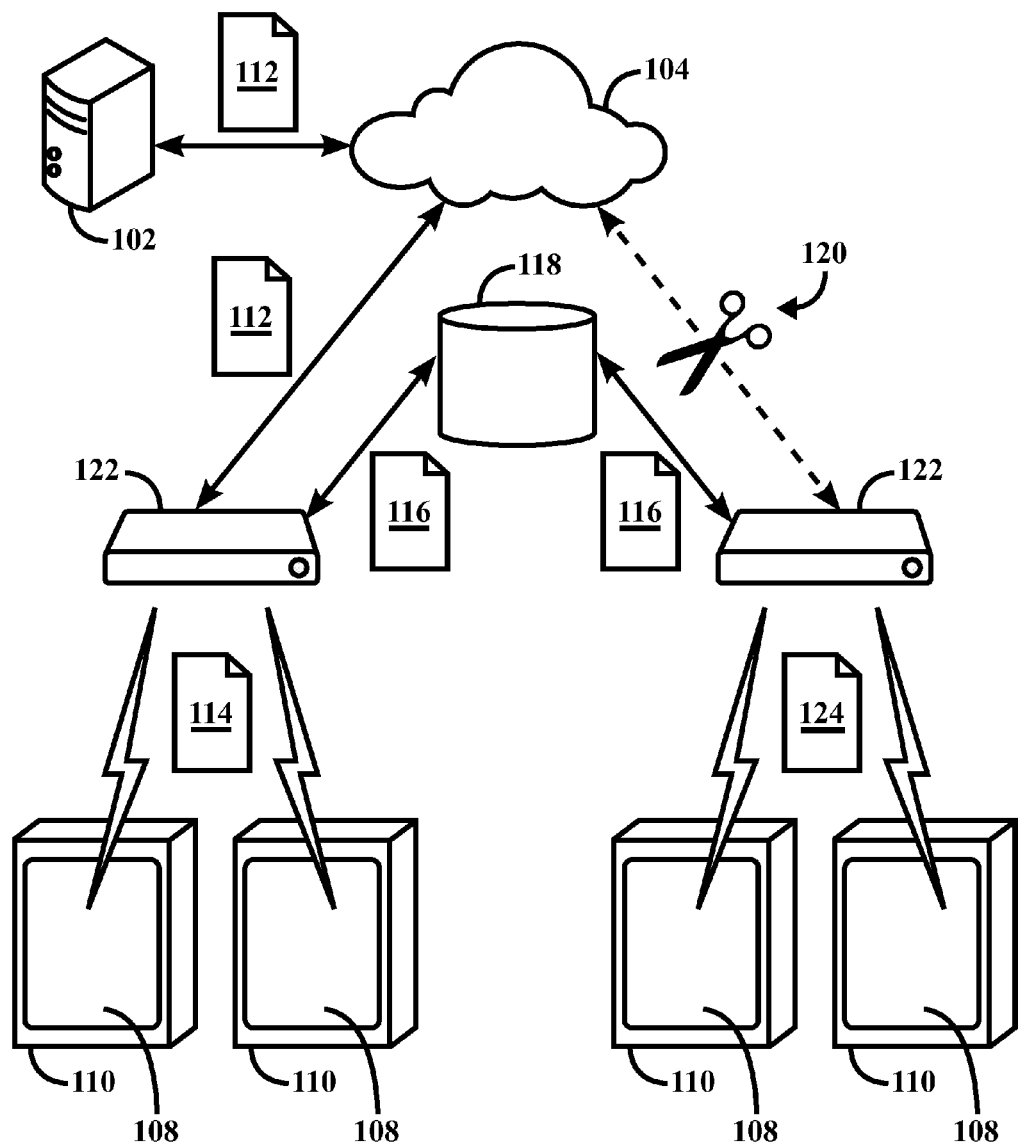
FIG. 1B is a diagram illustrating a system for automatically managing content for displays according to one embodiment of the invention.

One application of the invention is dynamic, electronic product packaging. In accordance with the current invention, a dynamic electronic product package display can be automatically modified throughout the lifecycle of the product package. Referring to FIGS. 1A and 1B, a box or other product container 110 has an electronic display 108 embedded in, affixed to or printed on one or more surfaces of the container 110. The electronic display 108 can be any suitable electronic display including electronic paper (such as E-Ink brand) or organic light emitting diode (OLED) displays. Such displays are very thin, lightweight and require little electrical power to operate. Power can be supplied from a local battery, attached terminals for connecting to an adjacent power source, an attached inductive coil, rectifier or other means of securing power wirelessly from a nearby power source, or some combination of the above.

The display 108 receives signals 114 about what information or content to show from a controller 106. The controller 106 contains a microprocessor, and may be embedded into the display 108 or the product package 110, or printed onto the packaging material of product package 110. Alternatively, as shown in FIG. 1B, a controller 122 may be physically separate from the display or displays 108 and the containers 110 that it is in communication with, and communicate with the display via a wired or wireless data connection.

The controller (106 or 122) receives instructions 112 from a content management system (CMS) 102 via a network connection 104 pertaining to information or content to be displayed. The controller 106 or 122 is also able to obtain data 116 from an external source 118. The instructions 112 from the CMS 102 may rely in part on the data 116 that the controller (106 or 122) obtains from external source 118. For example, the data 116 may be indicative of being in a warehouse, retail, or home environment and the instructions 112 may indicate specific content to be displayed depending on that information. In addition, the instructions 112 may indicate what to do when the controller 106/122 becomes unable to communicate with the CMS 102 for prolonged periods 120, in which case the controller 106/122 can send signals 124 to associated displays 108 regarding content to display, if any. For example, the instructions may indicate that the controller 106/122 and associated displays 108 should turn off and temporarily stop displaying content when the dynamic electronic product packages 110 are being shipped or temporarily stored in a warehouse.

In operation, referring to FIG. 2, the CMS 102 establishes communication with the controller 106/122 in step 202 and the controller 106/122 establishes communication with one or more electronic displays that are integrated into an object in step 210. Once the CMS 102 establishes communication with the controller 106/122, the CMS sends instructions to the controller for determining content to display in step 204. The instructions may depend on status information obtained by the controller as in step 206 or the instructions may pertain to action to be taken by the controller during extended periods when the CMS 102 is unable to communicate with the controller 106/122 as in step 208. The controller 106/122 obtains status information in step 212 from an external source. In step 214 the controller 106/122 determines the content to be displayed on associated displays based on the instructions from the CMS 102 and status information detected. These steps can be repeated throughout the lifecycle of the object associated with the display, such as if new status information requires displaying of new content or new instructions are sent based on changes in status information or other information.

The CMS 102 can be a software package running on a computer system other than the controller, and would be accessible via a wired or wireless network connection via some common networking protocol such as TCP/IP. The CMS 102 could be hosted on a computer residing on the same local area network (LAN) as the controllers, but preferably would be located on the Internet or a similar wide area network (WAN). The CMS software includes a number of modular features, which are discussed below.

One feature of the CMS software is for managing the activity state of connected controllers. When initialized (for example, when supplied with power or automatically powered on based on some previously-programmed heuristics such as the passage of a certain amount of time or the presence of a certain amount of light), controllers would automatically attempt to connect to a destination address or uniform resource locator (URL) to update the CMS with the latest status information obtained by the controllers, including information about any attached peripherals (such as connected displays), environmental factors accessible to the controller, content files or other files available to the controller, system status information, and the like. Controllers that reach the CMS server in this way would be considered "active". Other controllers listed in the CMS but not having contacted the CMS would be considered "inactive". The CMS could arrange, or allow a user to automatically arrange, both the active and inactive controllers into groups. These groups might be hierarchical or non-hierarchical and could be nested within other groups or have partial overlap with other groups.

Additionally, controllers might be placed into more than one group (for example, a controller might be placed into both the "Northeast US" group and the "New York City" group). This grouping functionality could be programmatically managed by rules, using any data available to the CMS, either from local or remote data stores, or from information transmitted back from connected controllers. For example, if a controller reported that its display became damaged or the controller stopped responding for some period of time, a rule in the CMS could automatically remove it from any groups it was a member of. The CMS can perform periodic inventories of all controllers and the displays they transmit instructions to. This might happen through a series of short, periodic data transmissions from controllers able to repeatedly connect to the CMS (for example, using regular HTTP GET or POST transmissions), or via transmitting data during longer lasting or persistent connections such as HTTP "long poll" connections or websockets connections).

In the context of the product package displays, new controllers and associated displays are frequently added (for example, when a new packaged good rolls off of the assembly line and is ready to be delivered) and removed (for example, when the packaged good is purchased by a customer who then removes and discards the package). Thus, the CMS includes a feature to automatically load a set of rules, content, or other information onto each controller when its presence is detected, describing what information should be displayed on each connected display. However, instead of merely loading a default set of content onto each controller when it is added, the CMS may also have a feature to intelligently assign information onto each controller based on rules that utilize some information supplied by the controller (for example the size and number of displays attached), the output of some sensor connected to the controller (for example, the latitude/longitude of the controller or the number of adjacent controllers detected), or information supplied from a local or remote data source (such as inventory information supplied from a webservice). Other rules could include scheduling information to appear at certain dates and times, functionality governing how long each piece of content should be displayed and on what portion of a display it should appear, and what each controller and connected display should do when the controller cannot reach the CMS for extended periods of time.

These organizations of content, referred to herein as playlists, could contain instructions for playing back content, retrieving data from local sensors or remote data stores, executing commands on the controller, and forcing communications with other controllers. Playlists could also contain references to other playlists, such that one playlist might be fully or partially embedded in another. The creation of playlists can be partially or fully automated by using rules to decide when the various content playback and other instructions should be executed, either generally, or for specific controllers. These rules could involve any data that the CMS collects from each controller (as described above), data obtained by the controller from local or remote data stores, and general programming logic. Playlists might also feature specific directives for controllers to execute in certain situations. For example, one directive might instruct the controller to display a partial image on its connected displays when other active controllers are nearby. In this way, each controller might show a portion of a larger image, allowing several displays to act as sub elements of a larger display (such as a video wall). In another example, a playlist might contain instructions to display one set of content files when drawing power from an external wired or wireless source, but switch to a different set of content when running from an internal battery, if one is connected. Playlists are applied to one or more controllers in order for the controllers to know what content playback and other instructions to execute. This may occur in one of three ways: a user could manually assign one or more playlists to one or more controllers (or one or more groups of controllers); playlists could automatically be assigned to one or more controllers (or groups of controllers) based on a set of pre-programmed rules; or a controller could force the automatic application of one or more playlists when it becomes active or upon a future connection to the CMS. Once a controller becomes active and one or more playlists are applied to it, the controller will begin a sequence of automated events to locate and download (if necessary) the components of the playlists, including content files, data files and other information needed for the successful playback of the scheduled items. As controllers display content and perform other tasks as outlined in the playlists assigned to them, they may collect data and either store it locally in memory or local storage (potentially for later transmission to the CMS) or immediately forward it to the CMS for storage. The CMS may use this collected data along with the aforementioned status information to update playlists, assign or unassign playlists to controllers, or trigger other events.

In a preferred embodiment, a box for a consumer product contains an integrated electronic display surface and a controller. The controller may include content (for example, content A, B, and C) and a set of rules. The display and the controller have identifiers. The display and the controller are powered by a combination of inductive coils designed to draw power from a wireless power source integrated into the shelving and fixtures of a retail store, as well as small, embedded batteries to be used when the external power source is not available.

When the production process is complete, the controller is activated and sends a signal to a CMS indicating that it has been activated, where it was produced, and its last known status, which could be ascertained through a sensor connected to the controller. The sensor senses information broadcast at the manufacturing facility. Based on this status information, the CMS automatically sends instructions to the controller to indicate that content A should be displayed. In addition, the CMS may send instructions to the controller to indicate that upon the controller obtaining a different set of status information, it should display content B. Such instructions may be accompanied by new content D, in the event that none of the pre-loaded content is appropriate. Prior to the controller being disconnected from the network and powered down in preparation for shipping, the CMS can send instructions to the controller to have it suppress content playback and switch off the connected displays when it is no longer able to contact the CMS.

When the box arrives at other destinations such a warehouse or retail store, the controller can detect new status information being broadcast at those venues and change the displayed content based on the set of rules it previously received from the CMS, such as to content C or D. The controller will also send the newly acquired status information along to the CMS, which will determine if the set of rules and/or content remains applicable based on the current status of the display. The updates and changes can continue as long as necessary. Changes in content or appearance can be based, for example, on changes in ambient light detected in the display's environment, the time of day, the day of the week, and the month. The content can be changed in nearly real time based on the detection of motion of the box, as well. When the product is purchased by an end user, the controller can detect a signal at checkout and update the content appropriately. The controller can also be made to detect when the box has been opened and change the displayed content to include, for example, a "use by" date, which could be calculated by sending the actual opening date to a remote webservice, which would then reply with a "use by" date that reflects the amount of time that the particular product is expected to remain fresh after opening. At the end of the lifecycle of the product, such as when the controller detects that several days have passed since the "use by" date, or the controller detects new status information being broadcast at a recycling facility, the display of content could cease. To the extent that the controller can communicate with the CMS to relay this information, or upon the passing of a certain amount of time since the last communication from the controller, the CMS can change the status of the display and controller to inactive.

The invention claimed is:

1. A system for automatically managing content for displays, comprising:
   a content management system in communication with a controller that is in communication with an electronic display that is integrated into an object having a primary function that does not traditionally rely upon an integrated electronic display, wherein:
   the display is embedded in, affixed to or printed on the object;
   the content management system automatically sends instructions to the controller for determining content to display;
   the instructions depend in part on status information automatically obtained by the controller from a source external to the object, display and controller; and
   at least one instruction pertains to an action to be taken based on the status information during at least part of a period that the controller is unable to communicate with the content management system, such period having a duration of at least twenty-four hours.

2. The system of claim 1, wherein the object is the packaging of a consumer product, an identification badge, a hotel key, a payment card, a driver's license, a restaurant menu, an event ticket, a reusable bag, a wall surface, a roadway, or a sidewalk.

3. The system of claim 1, wherein the controller is embedded in, affixed to or printed on the object.

4. The system of claim 1, wherein the controller is physically separate from the object and communicates with the display via a wired or wireless data connection.

5. The system of claim 1, wherein power is supplied to the display by a battery, a solar panel, or an inductive coil.

6. The system of claim 1, wherein the instructions include commands to turn the display on and off.

7. The system of claim 1, wherein the instructions are contained within a playlist.

8. The system of claim 1, wherein the source is a sensor that detects changes in environmental conditions.

9. The system of claim 1, wherein the status information includes the physical location of the display.

10. The system of claim 1, wherein the controller detects other displays that are located near the display, and sends instructions to the nearby displays to cause the nearby displays and the display to function together as a larger display.

11. A method for automatically managing content for displays comprising the steps of:
    establishing communication between a content management system and a controller that is in communication with an electronic display that is integrated into an object having a primary function that does not traditionally rely upon an integrated electronic display, wherein the display is embedded in, affixed to or printed on the object;
    sending instructions from the content management system to the controller for determining content to display, wherein the instructions depend in part on status information automatically obtained by the controller from a source external to the object, display and controller, and at least one instruction pertains to an action to be taken based on the status information during at least part of a period that the controller is unable to communicate with the content management system, such period having a duration of at least twenty-four hours;
    obtaining, by the controller, the status information; and
    determining, by the controller, the content to display based on the instructions and the status information.

12. The method of claim 11, wherein the object is the packaging of a consumer product, an identification badge, a hotel key, a payment card, a driver's license, a restaurant menu, an event ticket, a reusable bag, a wall surface, a roadway, or a sidewalk.

13. The method of claim 11, wherein the controller is embedded in, affixed to or printed on the object.

14. The method of claim 11, wherein the controller is physically separate from the object and communicates with the display via a wired or wireless data connection.

15. The method of claim 11, wherein power is supplied to the display by a battery, a solar panel, or an inductive coil.

16. The method of claim 11, wherein the instructions include commands to turn the display on and off.

17. The method of claim 11, wherein the instructions are contained within a playlist.

18. The method of claim 11, wherein the source is a sensor that detects changes in environmental conditions.

19. The method of claim 11, wherein the status information includes the physical location of the display.

20. The method of claim 11, wherein the controller detects other displays that are located near the display, and sends instructions to the nearby displays to cause the nearby displays and the display to function together as a larger display.

* * * * *